United States Patent [19]

Cicatelli

[11] 4,010,493
[45] Mar. 1, 1977

[54] TAPE TRANSPORT DEVICE

[75] Inventor: Rodolfo Cicatelli, Rome, Italy

[73] Assignee: Autovox S.p.A., Rome, Italy

[22] Filed: Apr. 1, 1975

[21] Appl. No.: 564,206

[30] Foreign Application Priority Data

Apr. 5, 1974  Italy .................................. 50169/74

[52] U.S. Cl. .................................. 360/96; 242/199; 360/105; 360/109
[51] Int. Cl.² .................... G11B 5/54; G11B 15/26; G11B 21/12
[58] Field of Search .................... 360/96, 105, 109; 242/193–194, 197–199, 200–202

[56] References Cited

UNITED STATES PATENTS

| | | | |
|---|---|---|---|
| 3,589,733 | 5/1968 | Piotrowski | 360/105 |
| 3,716,242 | 2/1973 | Maruyama | 360/105 |
| 3,729,202 | 4/1973 | Wakabayashi | 360/96 |
| 3,810,241 | 5/1974 | Murata | 360/96 |
| 3,893,186 | 7/1975 | Yoshii | 360/105 |

*Primary Examiner*—Alfred H. Eddleman
*Attorney, Agent, or Firm*—Cushman, Darby & Cushman

[57] ABSTRACT

A tape transport device for cassette recorders wherein a motor drives a flywheel and an idler wheel and wherein the capstan is formed in the shaft of the flywheel.

5 Claims, 5 Drawing Figures

TAPE TRANSPORT DEVICE

The present invention refers to a tape transport device or mechanism for cassette recording and/or reproducing apparatus.

There is an increasing tendency to install casette recorders in motorcars. The main difficulty of such an installation in the instrument board, where space is already at premium, lies in the relative thickness of the tape transport mechanism of the known recorders.

One object of the present invention is therefore to provide an extremely compact tape transport mechanism for cassette recorders, which permits to install within a very restricted space of the instrument panel a complete tape recorder provided with such mechanism and its controls.

It is a further object of the present invention to provide such a tape transport mechanism which is simple and unexpensive to produce and which is suited for mass production.

The tape transport device for cassette recorders, wherein a motor drives a flywheel and an idler wheel and wherein the capstan is formed by the shaft of said flywheel, according to the invention comprises: a wind member comprising a first gear and a second gear coaxial with said first gear and releasably coupled to it, said second gear meshing with a pinion rigid with said idler wheel; a freely rotatable rewind member; a flip-over arm carrying twin gears at one end, said flip-over arm being movable into a first position, wherein the upper one of its twin gears engages said first gear of the wind member and the lower one engages a gear which is rigid and coaxial with said idler wheel, to transmit thereby the drive of said motor to said wind member, and is movable into a second position, wherein its upper twin gear engages said rewind member, while its lower twin gear engages a gear which is rigid and coaxial with the flywheel, to transmit thereby a rewind motion from the motor to the rewind member, and is movable into a third, inoperative position intermediate its first and second position.

The invention will result clearly from the following description, made with reference to the attached drawings, of one of its possible embodiments, it being understood that said description has to be construed as being purely illustrative and in no way limitative to the invention. In the following disclosure and claims, the directions "right", "left", "clockwise", "counterclockwise", "top", "bottom", etc. are to be intended as they appear to the beholder of the figures being discussed.

Figure 1:
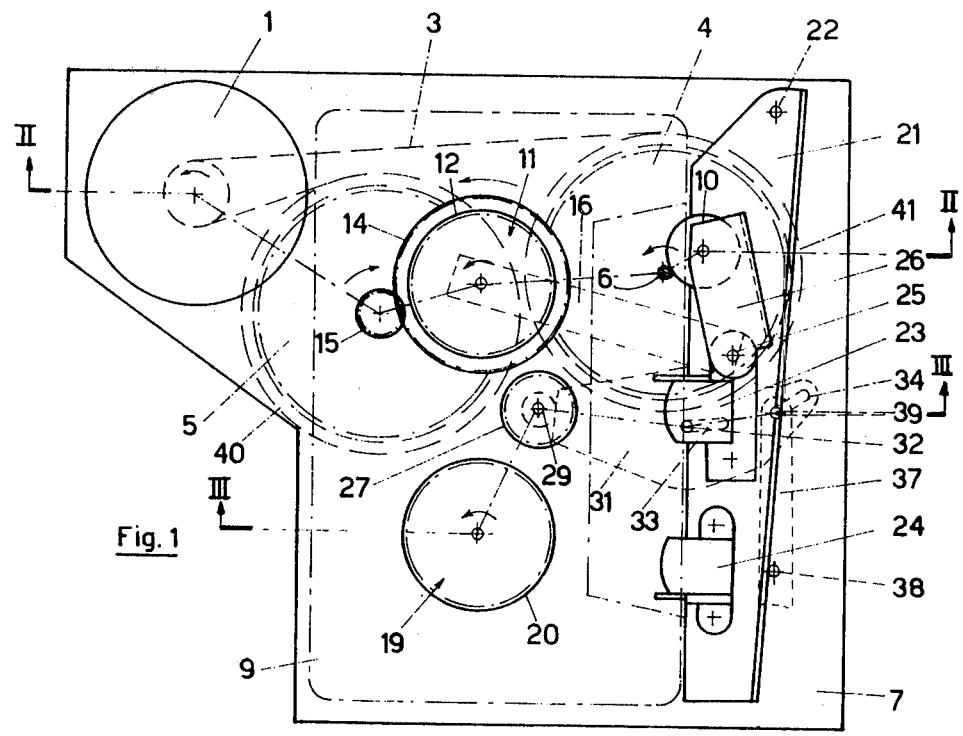
FIG. 1 is a plan view showing the tape transport mechanism of the embodiment, in its tape feed position.
Figure 2:
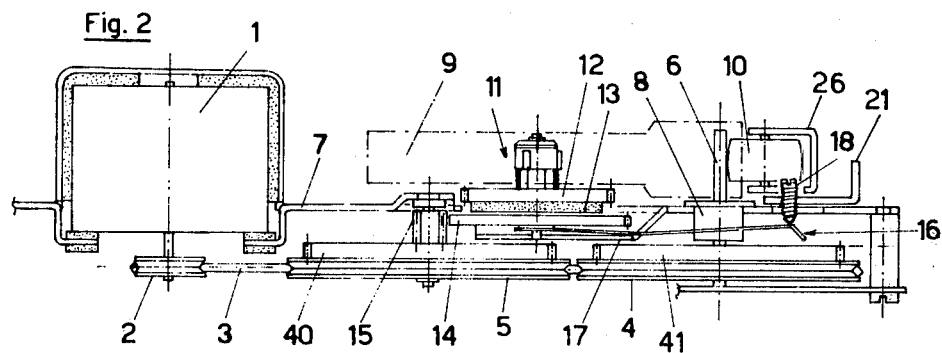
FIG. 2 is a schematic sectional view taken along line II—II of FIG. 1.

With reference to the drawings, wherein the same parts are indicated by the same reference numerals, a motor 1 is equipped with a pulley 2, which drives, through an endless elastic cord 3, a flywheel 4 and an idler wheel 5.

A capstan 6 is formed by the shaft of flywheel 4, which is journaled on a frame 7 through a bearing 8.

The tape is fed to the receiving reel of the cassette 9 by the capstan 6, against which it is spring biased by the pressure roller 10.

The receiving reel is inserted upon the wind member 11 which is integral with a first gear 12, which is friction coupled, by means of a friction ring 13, and is coaxial with a second gear 14 meshing with a pinion 15 integral with the initially mentioned idler wheel 5 journaled on frame 7.

Gear 14 is axially slidable on the shaft of gear 12 and is urged against the friction ring 13 by a flat spring 16 with a pressure which is adjustable by screw 18. The flat spring 16 is fulcrumed at 17. The assembly of the members 12, 13 and 14 will be called in the following "friction unit" for brevity.

This assembly will permit the member 11 to rotate at an angular speed which is variable as a function of the length of tape wound around the tape receiving reel. The tape-feeding reel of the cassete is inserted upon the rewind member 19, whose gear 20 remains freely rotatable during the tape feed and fast forward motion of the mechanism.

An arm 21, pivoted at 22 to the frame 7, carries a recording and playback head 23 and an erasing head 24. One end of a bracket 26 is pivotable around a pin 25 of arm 21, while the pressure roller 10 is pivotably mounted on its other end. The bracket 26 is spring biased against the capstan 6. The pin 25 is hollow and tapped and into it is screwed the adjustable screw 18.

During the fast forward and fast rewind operations, the arm 21 is swung counterclockwise to move the heads 23 and 24 and the pressure roller 10 away from the tape. Consequently, the screw 18 releases the spring 16 and therefore the gear 14 is uncoupled from gear 12.

Thus the friction unit is released or set free.

Figure 3:
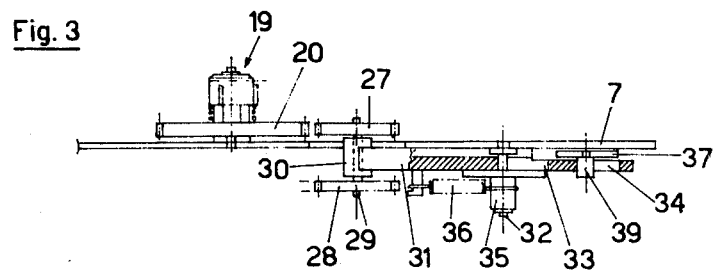
FIG. 3 is a schematic partly sectional view taken along line III—III of FIG. 1.

With reference to FIG. 3, two gears 27 and 28 are rigidly secured to a common shaft 29, which is supported in a bushing 30 at one end of a flip-over arm 31. A slot 33 is provided approximately at the center of the flip-over arm 31, while a second slot 34 is provided at its other end. Arm 31 is pivotably and slidably secured to frame 7 by a pin 32 passing through the slot 33 and is pressed against the frame 7 by a collar 35.

A coil spring 36 biases the pin 32 towards the left end of the slot 33, as shown in FIG. 3.

A control lever 37, pivoted at 38 under the frame 7 is linked to the flip-over arm 31 by its pin 39, which engages in the slot 34 of said arm.

In order to accomplish the fast rewind operation, the arm 21 is swung counterclockwise. This movement disengages the gear 14 from gear 12, and thus disengages gear 12 from the drive. This movement also withdraws the pressure roller 10 from the capstan 6 and thus also from the tape. Simultaneously it also moves the heads 23 and 24 away from the tape.

Figure 4:
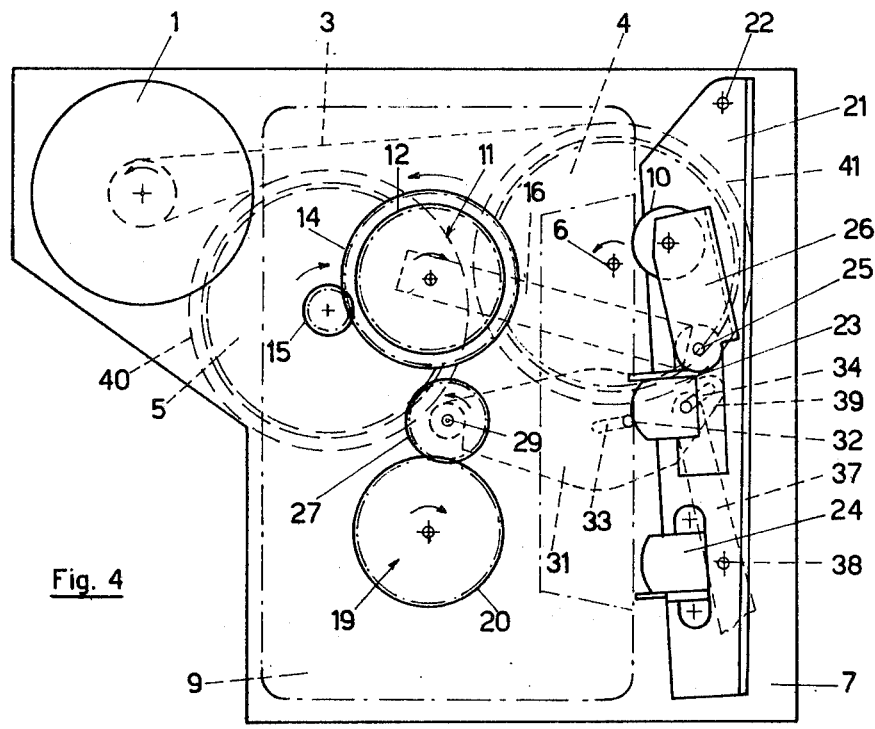
FIG. 4 is a plan view showing the tape transport mechanism of FIG. 1, in its fast rewind position.

By rotating now the control lever 37 counterclockwise (FIG. 4), the upper gear 27 will mesh with the rewind member 19, while its twin 28 will mesh with a gear 40, which is coaxial and rigid with the idler wheel 5. In this manner the drive will be transmitted from the motor 1, through the cord 3, to the rewind member 19.

Figure 5:
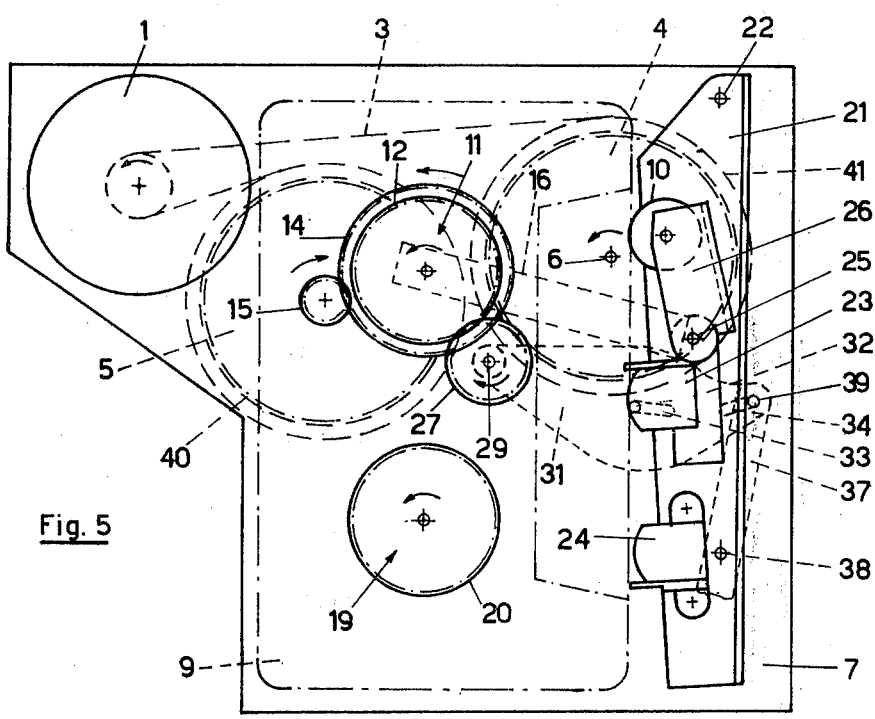
FIG. 5 is a plan view showing the tape transport mechanism of FIG. 1, in its fast forward position.

To obtain the fast forward motion of the tape, the arm 21 is again rotated counterclockwise, but the control lever 37 is rotated clockwise (FIG. 5).

Consequently, the upper twin gear 27 will be carried into engagement with gear 12, while the lower twin gear 28 will engage a gear 41, which is coaxial and rigid with the flywheel 4. In this manner the drive from the motor 1 will be transmitted to the wind member 11.

During the recording and playback operations, the twin gears 27 and 28 remain in their inoperative position, intermediate the wind member 11 and the rewind member 19, with the former receiving its drive from motor 1 through the idler wheel 5 and the pinion 15. In this operation the tape is fed by the capstan 6 against which it is pressed by the pressure roller 10, when the arm 21 is in the position shown in FIG. 1.

The arm 21 and the control lever 37 can be coupled together in such a manner that, by pivoting the control lever 37 around pivot 38 in either sense from its central position shown in FIG. 1, the arm 21 is swung counter-clockwise.

Obviously many and various changes may be applied to the above described embodiment of the invention, such as for instance part or all of the gears may be replaced by friction wheels. All these changes are to be construed as being encompassed in the scope of the invention.

What is claimed is:

1. A tape transport device for cassette recorders, wherein a motor drives a flywheel and an idler wheel and wherein the capstan is formed by the shaft of said flywheel, said device comprising:
    a wind member wherein a first gear is releasably coupled to a second gear coaxial with it, said second gear meshing with a pinion rigid with said idler wheel;
    a freely rotatable rewind member;
    a flip-over arm carrying upper and lower twin gears at one end, said flip-over arm being movable into a first position, wherein the upper one of its twin gears engages said first gear of the wind member and the lower one engages a gear which is rigid and coaxial with said flywheel, to transmit thereby the drive of said motor to said wind member, and is movable into a second position, wherein its upper twin gear engages said rewind member while its lower twin gear engages a gear which is rigid and coaxial with the idler wheel, to transmit thereby a rewind motion from the motor to the rewind member, and is movable into a third, inoperative position intermediate its first and second position.

2. A tape transport device according to claim 1, wherein the wind member comprises:
    a fist gear rigid with its shaft;
    a second gear axially slidable on said shaft; and
    a friction ring interposed between said first and said second gears.

3. A tape transport device according to claim 1, wherein the flip-over arm has a first slot intermediate its ends and a second slot at its end opposite said twin gears, a stationary pin engaging said first slot and said flip-over arm being linked to a control lever by a pin of said control lever engaging said second slot.

4. A tape transport device according to claim 1, further comprising: a pivotable arm carrying a recording head and an erasing head; a pressure roller for pressing the tape of the cassette against the capstan, said pressure roller being rotatable at one end of a bracket, whose other end is pivotably mounted on said arm, said bracket being spring biased against said capstan.

5. A tape transport device according to claim 4, wherein the counterclockwise rotation of said arm releases said second gear from said first gear of said wind member and its clockwise rotation frictionally engages said second gear to said first gear of said wind member.

* * * * *